March 28, 1967  J. H. COWLES  3,311,432
BEARING CUP WITH EXTERNAL RESTRAINING FLANGE
Filed June 23, 1964
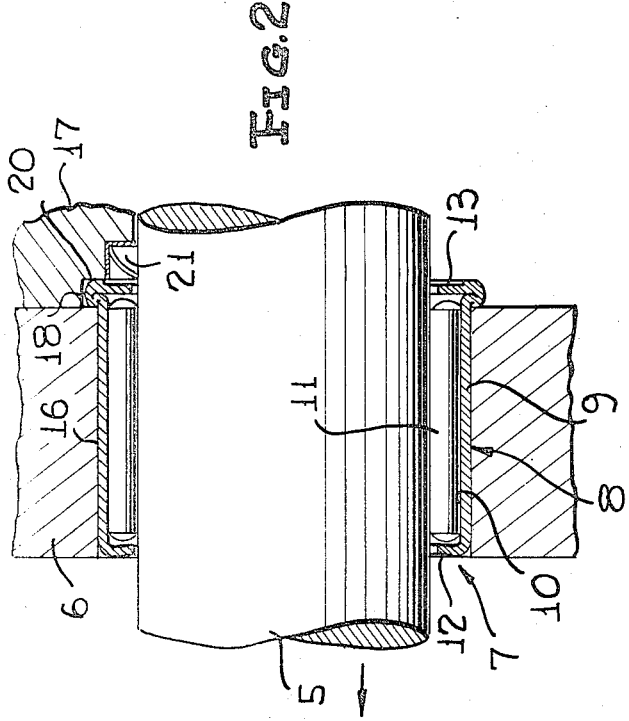
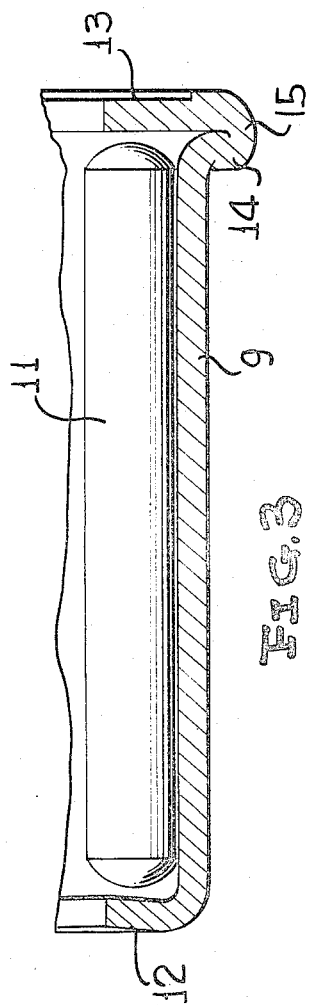
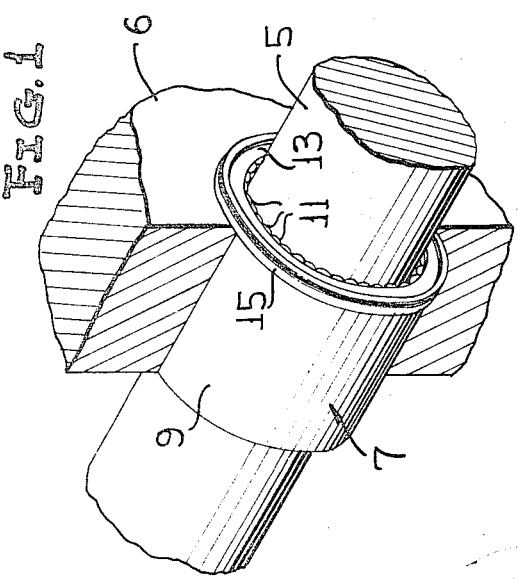
INVENTOR
JOHN H. COWLES
BY
Mason, Porter, Diller & Stewart
ATTORNEYS

United States Patent Office 3,311,432
Patented Mar. 28, 1967

3,311,432
BEARING CUP WITH EXTERNAL RESTRAINING FLANGE
John H. Cowles, Forestville, Conn., assignor to The Torrington Company, Torrington, Conn., a corporation of Maine
Filed June 23, 1964, Ser. No. 377,365
12 Claims. (Cl. 308—216)

This invention relates in general to new and useful improvements in bearings, and more particularly to a novel needle roller bearing construction.

The customary needle roller bearing includes a bearing shell or cup in which the rollers are positioned with the bearing shell or cup forming the outer race for the rollers. In the mounting of these bearings, a bore is formed through the housing in which the bearing is to be mounted, after which the bearing shell or cup is pressed into the bore. The bearing cup is retained within the housing by the frictional engagement of the bearing cup with the housing due to the press fit between the bearing cup and the housing. Under normal conditions, a shaft rotatably journalled within such a bearing exerts very minor, if any, axial forces on the bearing which tend to dislodge the bearing from within the housing axially of the shaft. However, in some installations there is a heavy radial force on the shafts which is transmitted through the bearings to thin wall or low tensile strength housings which dilate and allow the bearings to move axially of the shaft.

It would appear that the obvious solution to the problem would be to make the press fit between the bearing cup and the housing a tighter one so as to increase the frictional resistance to the movement of the bearing cup relative to the housing. This has been tried up to the yield strength of the housing and its has been found that sufficient frictional resistance to movement of the bearing cup cannot be obtained in this manner.

In view of the foregoing, it is the primary object of this invention to provide a novel bearing cup for rollers which has an external restraining flange that is engageable with a face of a housing wall for preventing the movement of the bearing cup through the housing bore in the direction in which the bearing cup is pressed into the housing bore.

Another object of this invention is to provide a novel bearing cup for rollers, which bearing cup is formed of sheet metal and which is provided with an external restraining flange by the simple expedient of outwardly reversely folding the metal of the bearing cup adjacent one end thereof.

Still another object of this invention is to provide a novel one-piece, sheet metal bearing cup which is provided at the opposite ends thereof with inwardly directed flanges for retaining rollers within the bearing cup and an external restraining flange adjacent one end of the bearing cup for engagement with a face of a housing wall for restraining the bearing cup against movement in the direction it is pressed into the housing bore.

A further object of this invention is to provide a novel, one-piece, sheet metal bearing cup for rollers which includes a cylindrical body defining an outer race on which rollers may roll, an inwardly directed annular flange at one end of the body for preventing movement of rollers out of the bearing cup at one end, the opposite end of the bearing cup body being provided with an external flange, which serves as a restraining flange, and the metal of the bearing cup being reversely folded at the outer edge of the external restraining flange to defined a second inwardly directed roller retaining flange.

With the above, and other objects in view that will hereinafter appear, the nature of the invention will be more clearly understood by reference to the following detailed description, the appended claims and the several views illustrated in the accompanying drawing.

In the drawing:

FIGURE 1 is a fragmentary perspective view with parts broken away and shown in section of a housing having mounted therein a shaft which passes through the housing and which is rotatably journalled within the housing by means of a roller bearing in accordance with this invention.

FIGURE 2 is an enlarged fragmentary elevational view of the housing and shaft assembly of FIGURE 1 and shows more specifically the details of the bearing and the relationship thereof with respect to both the housing and the shaft.

FIGURE 3 is an enlarged fragmentary vertical sectional view taken through the roller bearing and shows the specific details of the same as they would appear when the bearing is not mounted within the housing.

Referring now to the drawings in detail, it will be seen that there is illustrated a typical shaft mounting utilizing the roller bearing which is the subject of this invention. A shaft 5 passes through a housing wall 6 and is rotatably journalled within the housing wall 6 by means of a roller bearing formed in accordance with this invention, the roller bearing being generally referred to by the numeral 7.

It is to be understood that no attempt has been made to illustrate a specific type of housing. However, it has been deemed advisable here to describe a typical use of the shaft mounting illustrated in FIGURES 1 and 2 of the drawings. The housing could well be in the form of a steering box housing and the shaft 6 could be the Pitman shaft of the steering box. Such a Pitman shaft is mounted within two bearings which are on about a six inch center. The Pitman shaft carries a gear which is meshed with a drive gear carried by the usual shaft of the steering column which steering shaft has mounted thereon a steering wheel. Such Pitman shafts are heavily-loaded radially. The heavy radial load through the bearings to the housing dilates the housing resulting in a reduced press fit of the bearings in the housing. The bearings tend to move in the direction of the housing bore diameter which in the case of a steering gear box is into the interior of the steering box housing. Movement of the bearings greatly impairs the proper mesh between the two gears of the steering box. In accordance with this invention, it is proposed to make the roller bearings which support the shaft in a mannner whereby once the roller bearings have been pressed into the housing, movement of the bearings in the direction in which they are pressed into the housing is prevented.

The roller bearing 7 includes a bearing cup or shell which is generally referred to by the numeral 8. The bearing cup 8 includes a cylindrical body 9 having an inner surface 10 which defines an outer race for a plurality of rollers 11 positioned within the bearing cup 8. The rollers 11 are illustrated as directly rolling against the shaft 5 although an inner race defining sleeve could be mounted on the shaft 5 for engagement by the rollers 11.

The bearing cup body 9 is provided a tone end thereof with an inwardly directed roller retaining flange 12. At the opposite end of the body 9 there is provided a second roller retaining flange 13 which is also inwardly directed. The flange 13 is indirectly connected to the body 9 by an outwardly directed external restraining flange 14. It is to be noted that the flanges 13 and 14 are connected together by a reversely turned bight portion 15.

In the mounting of the bearing 7 within the housing wall 6, the housing wall 6 is provided with a bore 16.

The bore 16 is of a size to require the pressing of the bearing cup 8 into the housing wall 6. The bearing cup 8 is pressed into the bore 16 from right to left, as viewed in FIGURE 2. The bearing cup 8 is pressed into the bore 16 until the flange 14 comes into engagement with the outer surface or face of the housing wall 6. The restraining flange 14 now serves to prevent further movement of the bearing cup 8 to the left through the bore 16 into the interior of the housing of which the housing wall 6 is a part.

Housings having shafts extending entirely therethrough are normally provided with end plates to seal the housings against the escape of lubricants and the entrance of foreign matter. At this time, it is pointed out that roller bearings are normally lubricated by lubricants contained within the housings. In FIGURE 2 there is illustrated a portion of a conventional end plate 17 which is provided with an annular recess 18 of a size to receive the end portion of the bearing cup 8. The end plate 17 includes a wall 20 which opposes the end of the bearing cup 8 and which bears thereagainst to clamp the restraining flange 14 against the outer face of the housing wall 6. The end plate 17 may carry a shaft riding seal 21.

It will be readily apparent from the foregoing that the bearing 7 is installed in the housing wall 6 in the normal manner and that the use of the bearing 7 presents no unusual problems. At the same time, it will be seen that the weight of the bearing is not materially increased nor are there any peculiar machining problems involved since the bearing cup 8 is formed of sheet metal. However, it is to be recognized that special folding of the metal of the bearing cup 8 is required to provide for the restraining flange 14 and the reversely bent portion 15. While the disadvantages of the bearing cup 8 from a cost standpoint are minor, it will be readily apparent that the advantages of the bearing cup 8 from a use standpoint are highly desirable.

Although only a preferred embodiment of the invention has been specifically illustrated and described herein, it is to be understood that minor modifications may be made in the example bearing cup and bearing structure within the spirit and scope of the invention, as defined by the appended claims.

What is claimed as new:

1. A bearing cup for rollers, said bearing cup comprising a cylindrical body having at opposite ends thereof inwardly directed roller retaining flanges, an outwardly directed bearing cup restraining projection adjacent one of said roller retaining flanges and an integrally formed bight portion connecting said cup restraining projection and said adjacent flange.

2. A one-piece sheet metal bearing cup for rollers, said bearing cup comprising a cylindrical body having at opposite ends thereof inwardly directed roller retaining flanges, and an outwardly directed bearing cup restraining reversely folded flange of generally U-shaped cross-section adjacent one of said roller retaining flanges.

3. A bearing cup for rollers, said bearing cup comprising a cylindrical body having at one end thereof an inwardly directed roller retaining flange, said cylindrical body having at the other end thereof an outwardly directed bearing cup restraining flange, a second inwardly directed roller retaining flange, and a bight portion integrally connecting said bearing cup restraining flange and said second roller retaining flange.

4. A one-piece sheet metal bearing cup for rollers, said bearing cup comprising a cylindrical body having at opposite ends thereof inwardly directed roller retaining flanges, and an outwardly directed reversely folded bearing cup restraining projection adjacent one of said roller retaining flanges.

5. A one-piece sheet metal bearing cup for rollers said bearing cup comprising a cylindrical body having at one end thereof an inwardly directed roller retaining flange, said cylindrical body having at the other end thereof an outwardly directed bearing cup restraining flange of generally U-shaped cross-section, and a second inwardly directed roller retaining flange integrally connected to said bearing cup restraining flange.

6. A roller bearing comprising a bearing cup having a cylindrical body defining an outer bearing race, a plurality of rollers within said body in rolling contact therewith, said body having at opposite ends thereof inwardly directed roller retaining flanges, and an outwardly directed bearing cup restraining projection in the form of a reversely folded flange adjacent one of said roller retaining flanges.

7. The bearing of claim 6 wherein said bearing cup is formed of sheet metal, and said reversely folded flange is of relatively U-shaped cross-section.

8. A machine unit comprising a housing having a wall with a bore therethrough, a shaft extending through said bore, and a roller bearing tightly seated within said wall in said bore and supporting said shaft for rotation, said shaft having a heavy radial force thereon transmittable through said bearing to said wall to dilate said bore and temporarily loosen the fit between said bearing and said housing, said roller bearing including rollers and a bearing cup having an integral projection in the form of a reversely folded flange adjacent one end thereof abutting said wall and preventing movement of said bearing cup through said wall in the axial direction of said shaft.

9. A machine unit comprising a housing having a wall with a bore therethrough, a shaft extending through said bore, and a roller bearing tightly seated within said wall in said bore and supporting said shaft for rotation, said shaft having a heavy radial force thereon transmittable through said bearing to said wall to dilate said bore and temporarily loosen the fit between said bearing and said housing, said roller bearing including rollers and a bearing cup having an integral projection in the form of a reversely folded flange adjacent one end thereof abutting said wall and preventing movement of said bearing cup through said wall in the axial direction of said shaft, and a cover plate for said housing clampingly retaining said projection in abutting engagement with said wall.

10. The machine unit of claim 8 wherein said bearing cup is of a one-piece sheet metal construction.

11. The machine unit of claim 8 wherein said bearing cup is of a one-piece sheet metal construction, and said reversely folded flanges of generally U-shaped cross-section with an arm of the U extending radially inwardly and forming a roller retaining flange.

12. A one-piece sheet metal bearing cup for rollers having an external restraining flange of generally U-shaped cross-section.

References Cited by the Examiner

UNITED STATES PATENTS

| 1,420,497 | 6/1922 | Page | 308—207 |
|---|---|---|---|
| 3,193,338 | 7/1965 | Weidmann | 308—212 |

FOREIGN PATENTS 820,237   9/1959   Great Britain.

MARTIN P. SCHWADRON, *Primary Examiner.*

F. SUSKO, *Assistant Examiner.*